(12) United States Patent
Murata et al.

(10) Patent No.: US 10,001,171 B2
(45) Date of Patent: Jun. 19, 2018

(54) ROLLING BEARING

(71) Applicant: JTEKT CORPORATION, Osaka-shi, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/472,905

(22) Filed: Mar. 29, 2017

(65) Prior Publication Data

US 2017/0292569 A1 Oct. 12, 2017

(30) Foreign Application Priority Data

Apr. 6, 2016 (JP) .................................. 2016-076732

(51) Int. Cl.
*F16C 33/66* (2006.01)
*F16C 19/36* (2006.01)
*F16C 33/46* (2006.01)

(52) U.S. Cl.
CPC ........ *F16C 33/6681* (2013.01); *F16C 19/364* (2013.01); *F16C 33/4623* (2013.01); *F16C 33/4676* (2013.01)

(58) Field of Classification Search
CPC ..... F16C 19/364; F16C 19/383–19/388; F16C 33/4605; F16C 33/6681; F16C 33/4676; F16C 33/4623
See application file for complete search history.

(56) References Cited

U.S. PATENT DOCUMENTS

| 3,694,043 | A | * | 9/1972 | Tellson | ................. | F16C 19/364 |
| | | | | | | 384/578 |
| 3,940,193 | A | * | 2/1976 | Molloy | ................. | F16C 19/364 |
| | | | | | | 29/898.067 |
| 4,400,040 | A | * | 8/1983 | Toth | ...................... | F16C 19/364 |
| | | | | | | 384/465 |
| 4,523,862 | A | * | 6/1985 | Yasui | .................... | F16C 19/364 |
| | | | | | | 384/564 |
| 4,707,152 | A | * | 11/1987 | Neese | ................... | F16C 19/364 |
| | | | | | | 384/572 |
| 4,770,424 | A | * | 9/1988 | Otto | ........................ | B61F 15/22 |
| | | | | | | 277/351 |

(Continued)

FOREIGN PATENT DOCUMENTS

JP 2007-270970 A 10/2007

*Primary Examiner* — Alan B Waits
(74) *Attorney, Agent, or Firm* — Oliff PLC

(57) ABSTRACT

A rolling bearing includes an inner ring, an outer ring, a plurality of rolling elements arranged between a raceway surface of the inner ring and a raceway surface of the outer ring, and a cage that holds the rolling elements at intervals in a circumferential direction. The raceway surfaces have a contact angle with each of the rolling elements. An area of clearances formed among the inner ring, the outer ring, the rolling elements, and the cage as axially viewed from an axially first side of the raceway surfaces that is a small diameter side of the raceway surfaces is larger than an area of clearances formed among the inner ring, the outer ring, the rolling elements, and the cage as axially viewed from an axially second side of the raceway surfaces that is a large diameter side of the raceway surfaces.

10 Claims, 5 Drawing Sheets

(56) References Cited

U.S. PATENT DOCUMENTS

| | | | | |
|---|---|---|---|---|
| 4,812,058 | A * | 3/1989 | Hofmann | F16C 19/364 |
| | | | | 384/563 |
| 8,172,464 | B2 * | 5/2012 | Matsushita | F16C 19/364 |
| | | | | 384/569 |
| 8,783,966 | B2 * | 7/2014 | Schlegel | F16C 33/4605 |
| | | | | 384/448 |
| 8,851,761 | B2 * | 10/2014 | Miyachi | F16C 19/364 |
| | | | | 384/576 |
| 2012/0163748 | A1 * | 6/2012 | Henneberger | F16C 33/4605 |
| | | | | 384/564 |
| 2014/0013603 | A1 * | 1/2014 | Miyachi | B25B 27/14 |
| | | | | 29/898.064 |
| 2015/0369290 | A1 * | 12/2015 | Dittmar | F16C 33/4682 |
| | | | | 384/565 |
| 2017/0204906 | A1 * | 7/2017 | Koganei | F16C 33/4605 |
| 2017/0204909 | A1 * | 7/2017 | Murata | F16C 19/364 |

\* cited by examiner

ROLLING BEARING

INCORPORATION BY REFERENCE

The disclosure of Japanese Patent Application No. 2016-076732 filed on Apr. 6, 2016 including the specification, drawings and abstract, is incorporated herein by reference in its entirety.

BACKGROUND OF THE INVENTION

1. Field of the Invention

The invention relates to a rolling bearing having a contact angle, such as a tapered roller bearing or an angular contact ball bearing.

2. Description of the Related Art

Tapered roller bearings have a larger load carrying capacity and a higher rigidity than other rolling bearings with the same size. Thus, tapered roller bearings are often used in shaft support portions of industrial machines including automobiles, for example, inside power transmission mechanisms such as differential apparatuses and transmissions (see, for example, Japanese Patent Application Publication No. 2007-270970 (JP 2007-270970 A). A conventional tapered roller bearing includes an inner ring 101, an outer ring 102, a plurality of tapered rollers 103, and a cage 104. The tapered rollers 103 are arranged between the inner ring 101 and the outer ring 102. The cage 104 holds the tapered rollers 103 at intervals. The cage 104 is formed by punching a metal plate such as a steel plate. A radially inward bent portion 105 is formed at a small end face side of each of the tapered rollers 103.

In general, factors that cause a rotational torque to be exerted on the tapered roller bearing include rolling viscous resistance between each of the tapered rollers and the raceway surfaces, sliding resistance between an inner-ring rib face and the end face of each tapered rollers, and stirring resistance of lubricant. Due to pump action, lubricant flows into the tapered roller bearing through an axially first end thereof that is a small diameter side of the raceway surface and flows out of the tapered roller bearing through an axially second end thereof that is a large diameter side of the raceway surface. Thus, as depicted in FIG. 6, the bent portion 105 formed on the cage 104 limits inflow of the lubricant to suppress the stirring resistance, which is one of the factors that cause exertion of the rotational torque.

However, a reduced amount of lubricant is supplied to the tapered roller bearing depending on an internal structure of the power transmission mechanism. In such an environment, when the bent portion of the cage limits the inflow of the lubricant, the insufficient lubrication disadvantageously leads to an increase in temperature, shortening the life of the tapered roller bearing. In particular, the temperature is more prone to increase in the tapered roller bearing than in ball bearings and the like. Thus, in an environment in which the tapered roller bearing is supplied with only a small amount of lubricant, promoting lubrication with balance with the stirring resistance taken into account is important.

SUMMARY OF THE INVENTION

An object of the invention is to provide a rolling bearing that can be appropriately lubricated during use even in an environment where the rolling bearing is supplied with only a small amount of lubricant.

A rolling bearing in an aspect of the invention includes an inner ring having a raceway surface on an outer periphery of the inner ring, an outer ring having a raceway surface on an inner periphery of the outer ring, a plurality of rolling elements arranged between the raceway surface of the inner ring and the raceway surface of the outer ring, and a cage that holds the rolling elements at intervals in a circumferential direction. The raceway surfaces have a contact angle with each of the rolling elements. An area of clearances formed among the inner ring, the outer ring, the rolling elements, and the cage as axially viewed from an axially first side of the raceway surfaces that is a small diameter side of the raceway surfaces is larger than an area of clearances formed among the inner ring, the outer ring, the rolling elements, and the cage as axially viewed from an axially second side of the raceway surfaces that is a large diameter side of the raceway surfaces.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
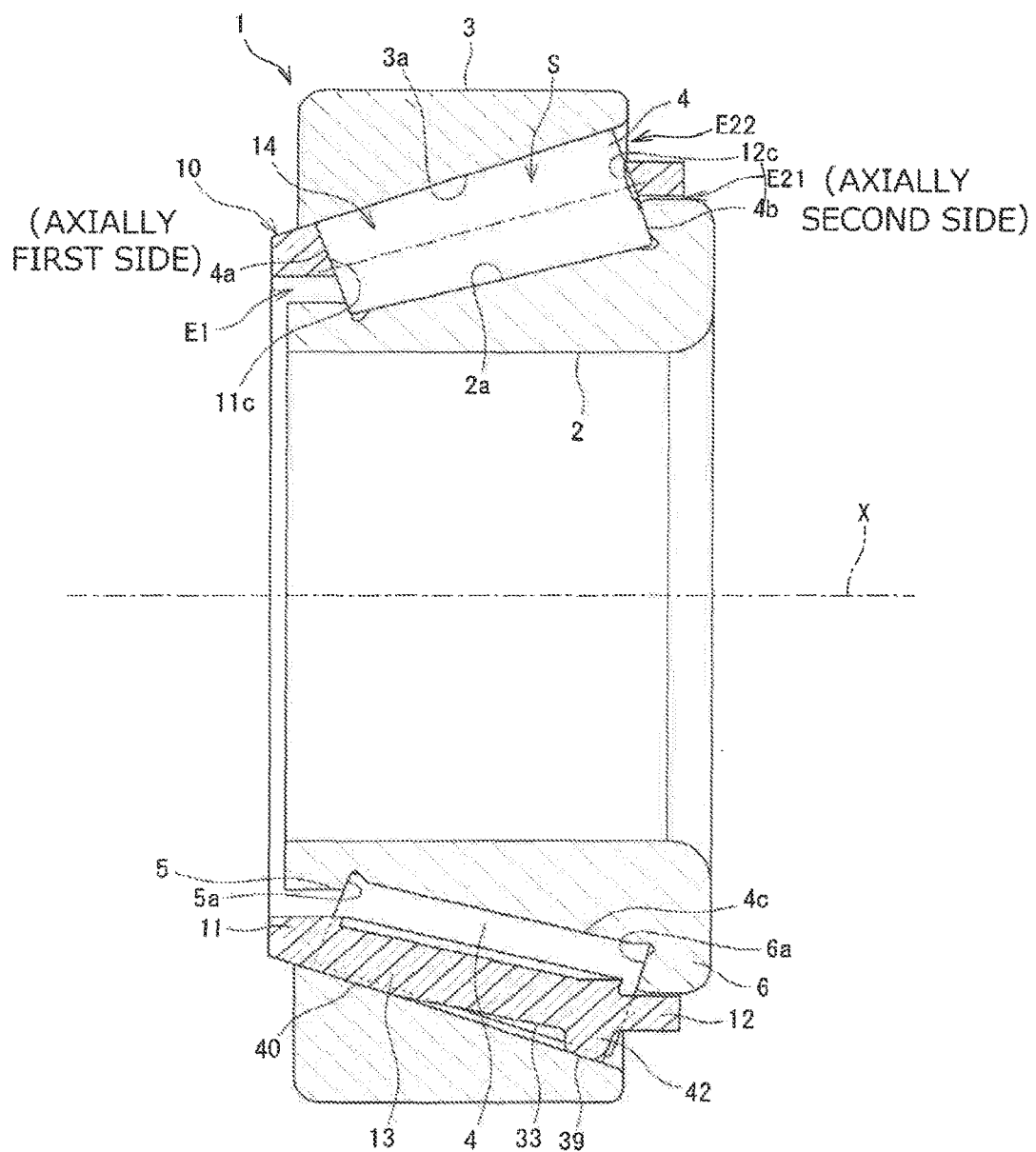
FIG. 1 is an axial sectional view depicting a rolling bearing according to an embodiment of the invention.

An embodiment of the invention will be described below with reference to the drawings. FIG. 1 is an axial sectional view depicting a rolling bearing according to the embodiment of the invention. A rolling bearing 1 in the present embodiment is a tapered roller bearing. The tapered roller bearing 1 is assembled into a power transmission mechanism such as a differential apparatus or a transmission that is provided in various industrial machines.

The tapered roller bearing 1 has an inner ring 2, an outer ring 3, a plurality of tapered rollers 4, and a cage 10 that holds the tapered rollers 4. The inner ring 2, the outer ring 3, and the cage 10 are annular members (shaped like short cylinders) centered around an axis X. The tapered roller bearing 1 is lubricated with lubricant (oil) that lubricates the power transmission mechanism and the like.

The inner ring 2 is formed of bearing steel or steel for machine structures. A tapered inner-ring raceway surface 2a is formed on an outer periphery of the inner ring 2 such that the tapered rollers 4 roll on the inner-ring raceway surface 2a. The inner-ring raceway surface 2a has a diameter increasing from an axially first side toward an axially second side. The inner ring 2 has a cone front face rib 5 (hereinafter, referred to as a small rib) and a cone back face rib 6

(hereinafter, referred to as a large rib). The small rib 5 is located adjacent to and on the axially first side (in FIG. 1, the left side) of the inner-ring raceway surface 2*a* so as to protrude outward in a radial direction. The large rib 6 is located adjacent to and on the axially second side (in FIG. 1, the right side) of the inner-ring raceway surface 2*a* so as to protrude outward in the radial direction.

Like the inner ring 2, the outer ring 3 is also formed of bearing steel or steel for machine structures. A tapered outer-ring raceway surface 3*a* is formed on an inner periphery of the outer ring 3 such that the tapered rollers 4 roll on the outer-ring raceway surface 3*a*. The outer-ring raceway surface 3*a* has a diameter increasing from the axially first side toward the axially second side. The outer-ring raceway surface 3*a* is located outward of the inner-ring raceway surface 2*a* in the radial direction so as to face the inner-ring raceway surface 2*a*.

The tapered rollers 4 are formed of bearing steel or the like. The tapered rollers 4 are interposed between the inner-ring raceway surface 2*a* and the outer-ring raceway surface 3*a* so as to be able to roll. A conical rolling surface 4*c* is formed on an outer periphery of each of the tapered rollers 4. The tapered roller 4 has a small end face 4*a* formed on the axially first side and having a small diameter and a large end face 4*b* formed on the axially second side and having a large diameter. The small end face 4*a* is in sliding contact with a rib face 5*a* of the small rib 5. The large end face 4*b* is in sliding contact with a rib face 6*a* of the large rib 6.

Figure 2:
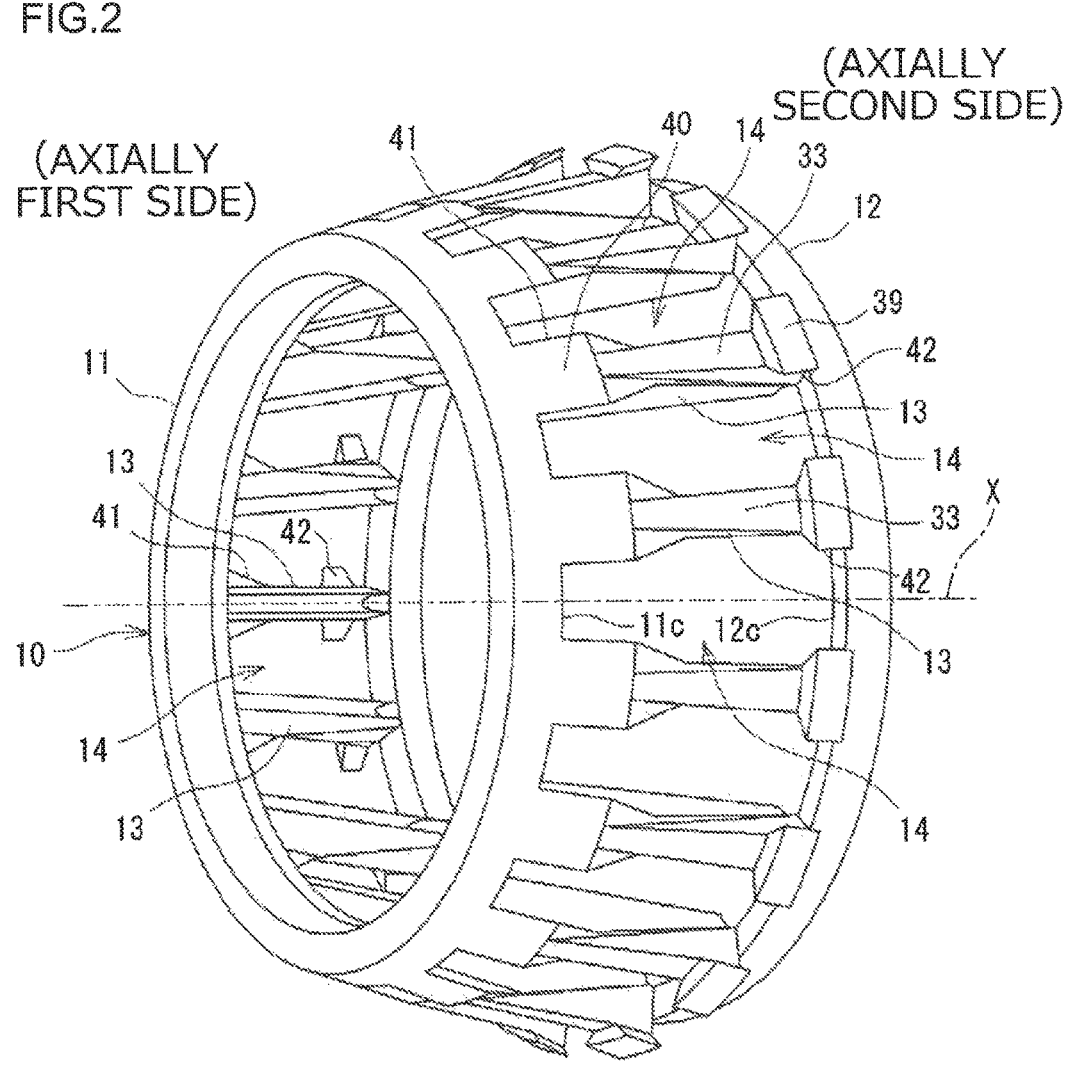
FIG. 2 is a perspective view depicting a cage of the rolling bearing.

FIG. 2 is a perspective view depicting the cage 10. In FIG. 1 and FIG. 2, the cage 10 has a small-diameter annular portion 11, a large-diameter annular portion 12, and a plurality of cage bars 13. The small-diameter annular portion 11 and the large-diameter annular portion 12 are formed like circular rings. The small-diameter annular portion 11 is arranged at an axially first-side end of the cage 10. The large-diameter annular portion 12 is arranged at an axially second-side end of the cage 10. The small-diameter annular portion 11 and the large-diameter annular portion 12 are arranged at a distance from each other in an axial direction.

The cage bars 13 are provided at equal intervals in the circumferential direction to couple the small-diameter annular portion 11 and the large-diameter annular portion 12 together. Pockets 14 that house (hold) the tapered rollers 4 are each formed in a space between the annular portions 11, 12 and between two cage bars 13, 13 adjacent to each other in the circumferential direction. The cage 10 in the present embodiment is formed of, for example, a resin material such as polyphenylene sulfide resin (PPS resin).

In FIG. 1, the cage 10 is provided in an annular space S formed between the inner ring 2 and the outer ring 3. One tapered roller 4 is housed in each of the pockets 14. The tapered rollers 4 are held by the cage 10 at equal intervals in the circumferential direction. The small-diameter annular portion 11 is positioned outward of the small rib 5 of the inner ring 2 in the radial direction. The large-diameter annular portion 12 is positioned outward of the large rib 6 of the inner ring 2 in the radial direction.

In FIG. 1, axially inner surfaces 11*c* and 12*c* of the small-diameter annular portion 11 and large-diameter annular portion 12 of the cage 10 face each of the pockets 14 and are configured to be able to contact the small end face 4*a* and the large end face 4*b* of each of the tapered rollers 4. Therefore, the small-diameter annular portion 11 and the large-diameter annular portion 12 regulate movement of the cage 10 in the axial direction to position the cage 10.

The cage 10 is positioned in the radial direction with a part of the cage 10 (guided surfaces 40, 39) in sliding contact with the outer-ring raceway surface 3*a* of the outer ring 3.

In FIG. 2, each of the cage bars 13 has a first guided portion 41 and a second guided portion 42. The first guided portion 41 is provided at an axially first-side end of the cage bar 13. The first guided portion 41 is located on a radially outer side of the cage bar 13 so as to extend toward opposite sides in the circumferential direction. The first guided portion 41 has a guided surface 40 that corresponds to a radially outer surface of the first guided portion 41 and that is in sliding contact with the outer-ring raceway surface 3*a*. The guided surface 40 of the first guided portion 41 is flush with an outer peripheral surface of the small-diameter annular portion 11.

A second guided portion 42 is provided at an axially second-side end of the cage bar 13. The second guided portion 42 is located on a radially outer side of the cage bar 13 so as to extend in the circumferential direction. The second guided portion 42 has a guided surface 39 that corresponds to a radially outer surface of the second guided portion 42 and that is in sliding contact with the outer-ring raceway surface 3*a*. A recessed portion 33 is formed between the first guided portion 41 and the second guided portion 42 on the radially outer side of the cage bar 13. The recessed portion 33 enables the adjacent pockets 14 to communicate with each other to allow lubricant near the outer-ring raceway surface 3*a* of the outer ring 3 to flow between the adjacent pockets 14. This enables a reduction in stirring resistance of the lubricant.

The tapered roller bearing 1 in the present embodiment is lubricated with lubricant housed in a case of a power transmission mechanism such as a differential apparatus or a transmission. In FIG. 1, the outer-ring raceway surface 3*a* of the outer ring 3 has a diameter increasing from the axially first side toward the axially second side. Thus, rotation of the tapered roller bearing 1 (in the present embodiment, the inner ring 2) produces an effect (pump action) that the lubricant flows through the annular space S formed between the inner ring 2 and the outer ring 3, from the axially first side toward the axially second side. Such a pump action resulting from rotation of the tapered roller bearing 1 allows the lubricant outside the tapered roller bearing 1 to flow into the annular space S between the inner ring 2 and the outer ring 3 through the axially first-side end of the tapered roller bearing 1 and to flow out of the annular space S through the axially second-side end of the tapered roller bearing 1. In other words, the lubricant passes through the annular space S.

Figure 3:
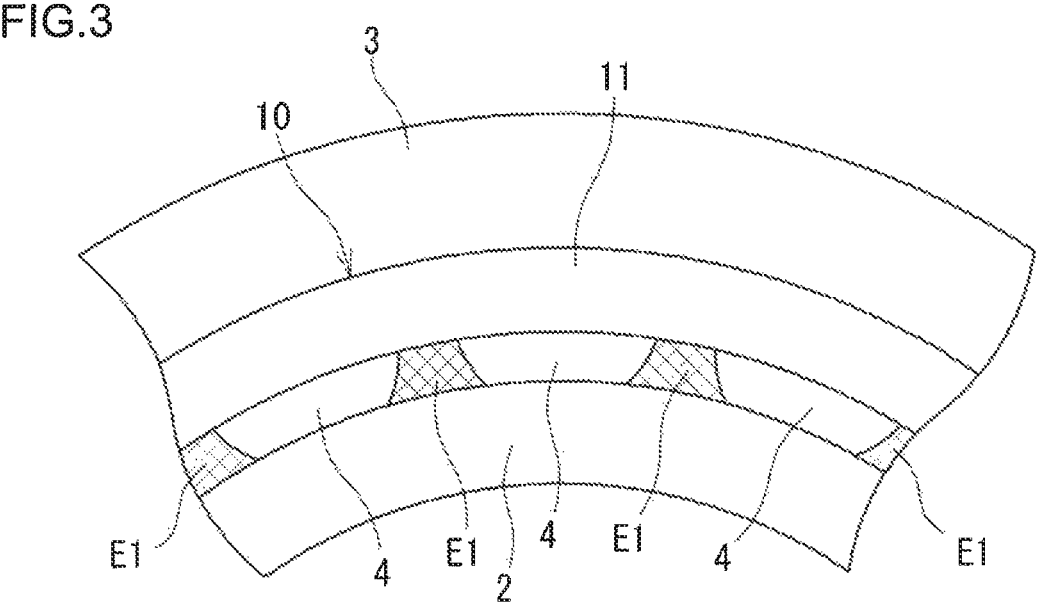
FIG. 3 is a diagram of the rolling bearing as viewed from an axially first side (a small diameter side of a raceway surface)

FIG. 3 is a diagram of the tapered roller bearing 1 as viewed from the axially first side (from small diameter sides of the raceway surfaces 2*a*, 3*a*). The small-diameter annular portion 11 of the cage 10 and the outer ring 3 are arranged at a substantially no distance from each other in the radial direction. The small-diameter annular portion 11 and the inner ring 2 are arranged at a relatively long distance from each other in the radial direction. Thus, clearances E1 (cross-hatched portions) are each formed between the small-diameter annular portion 11 of the cage 10 and the inner ring 2 and between the tapered rollers 4 adjacent to each other in the circumferential direction. Since the lubricant flows into the tapered roller bearing 1 through the axially first-side end thereof as described above, the clearances E1 serve as inlets for the lubricant.

Figure 4:
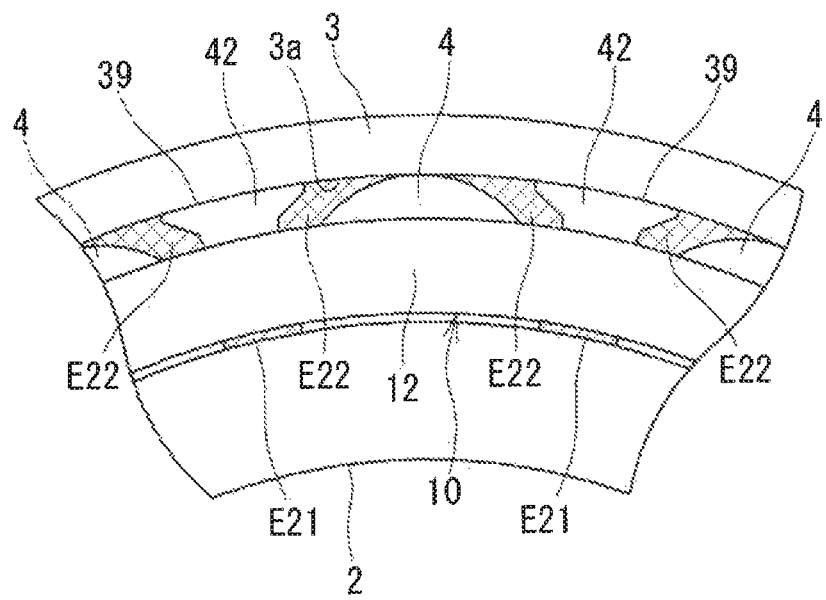
FIG. 4 is a diagram of the rolling bearing as viewed from an axially second side (a large diameter side of the raceway surface)

FIG. 4 is a diagram of the tapered roller bearing 1 as viewed from the axially second side (from large diameter sides of the raceway surfaces 2*a*, 3*a*). The large-diameter annular portion 12 of the cage 10 and the inner ring 2 are arranged at a slight distance from each other in the radial direction. The large-diameter annular portion 12 and the outer ring 3 are arranged at a relatively long distance from each other in the radial direction. Thus, slight clearances E21 (cross-hatched portions) are each formed between the large-diameter annular portion 12 of the cage 10 and the inner ring 2 and between the tapered rollers 4 adjacent to each other in the circumferential direction. Clearances E22 (cross-hatched portions) are also each formed between the large-diameter annular portion 12 of the cage 10 and the outer ring 3 and between the tapered rollers 4 adjacent to each other in the circumferential direction. As described above, the lubricant flows out of the tapered roller bearing 1 through the axially second-side end thereof. Thus, the clearances E21, E22 serve as outlets for the lubricant.

As described above, the second guided portions 42 are each provided on the corresponding cage bar 13 of the cage 10. The second guided portions 42 are each arranged between the adjacent tapered rollers 4 and shaped to extend toward the opposite sides in the circumferential direction such that the circumferential dimension of the second guided portion 42 increases toward the outer side in the radial direction. Specifically, the second guided portions 42 extend in the circumferential direction substantially along the outer peripheral surface of the tapered rollers 4. Each of the guided surfaces 39, which are outer peripheral surfaces of the second guided portion 42, and the outer ring 3 are arranged at a substantially no distance from each other in the radial direction. Therefore, the second guided portions 42 function as blocking portions that block a part of each of the outlets E22, which are clearances among the large-diameter annular portion 12, the outer ring 3, and the tapered rollers 4.

As depicted in FIG. 3 and FIG. 4, in the present embodiment, the area A of the lubricant inlets E1 and the area B of outlets E21, E22 all over the tapered roller bearing 1 are set to be in the following relationship.

$$A/B > 1 \quad (1)$$

That is, the area A of the inlets E1 is larger than the area B of the outlets E21, E22. Therefore, the lubricant flows easily into the tapered roller bearing 1 but has difficulty in flowing out of the tapered roller bearing 1. Thus, even if only a small amount of lubricant is supplied to the tapered roller bearing 1 inside the case of the power transmission apparatus, the lubricant is easily stored inside the tapered roller bearing 1, enabling suitable lubrication. This can restrain increase in temperature of the tapered roller bearing 1g, suppressing a reduction in the life of the tapered roller bearing 1.

In the present embodiment, on each of the cage bars 13, the second guided portion 42 is formed which provides the guided surface 39 that is in sliding contact with the outer-ring raceway surface 3a. The second guided portions 42 function as blocking portions that block a part of each of the lubricant outlets E22, thus reducing the outlets E22 in size. Thus, the second guided portions 42 have two functions, allowing simplification of the structure. However, the blocking portions may be provided separately from the second guided portions 42.

The radial distance between the small-diameter annular portion 11 of the cage 10 and the inner ring 2 is longer than the radial distance between the small-diameter annular portion 11 and the outer ring 3. The lubricant inlets E1 are mostly formed between the inner ring 2 and the small-diameter annular portion 11, that is, located radially inner part between the inner ring 2 and the outer ring 3. Therefore, when the tapered roller bearing 1 is configured such that the inner ring 2 rotates, the lubricant can easily flow into the tapered roller bearing 1.

The lubricant having flowed into the tapered roller bearing 1 moves outward in the radial direction as a result of rotation of the inner ring 2. Consequently, the lubricant can be spread throughout the inside of the tapered roller bearing 1. The lubricant flows in the vicinity of the sliding contact portion between the small rib 5 of the inner ring 2 and the small end face 4a of each of the tapered rollers 4. Thus, the sliding contact portion can be suitably lubricated, enabling a reduction in sliding resistance and suppression of increase in temperature.

The radial distance between the large-diameter annular portion 12 of the cage 10 and the outer ring 3 is longer than the radial distance between the large-diameter annular portion 12 and the inner ring 2. Thus, the lubricant has more difficulty in flowing out through the outlets E21 than through the outlets E22. This allows the lubricant to be easily stored in the sliding contact portion between the large rib 6 of the inner ring 2 and the large end face 4b of each tapered roller 4. Consequently, the sliding contact portion can be suitably lubricated. This enables a reduction in sliding resistance between the large rib 6 and each tapered roller 4, suppressing increase in temperature.

Figure 5:
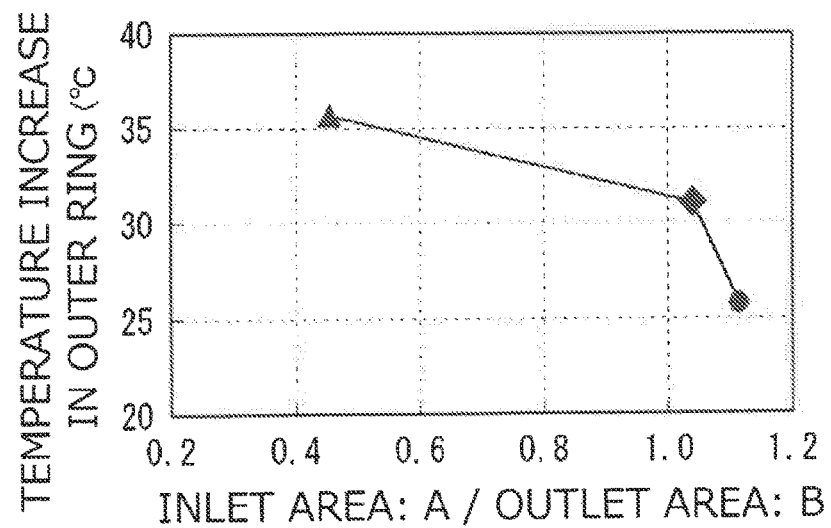
FIG. 5 is a graph indicating a relationship between an increase in the temperature of an outer ring and a ratio between the area of lubricant inlets and the area of lubricant outlets.
Figure 6:
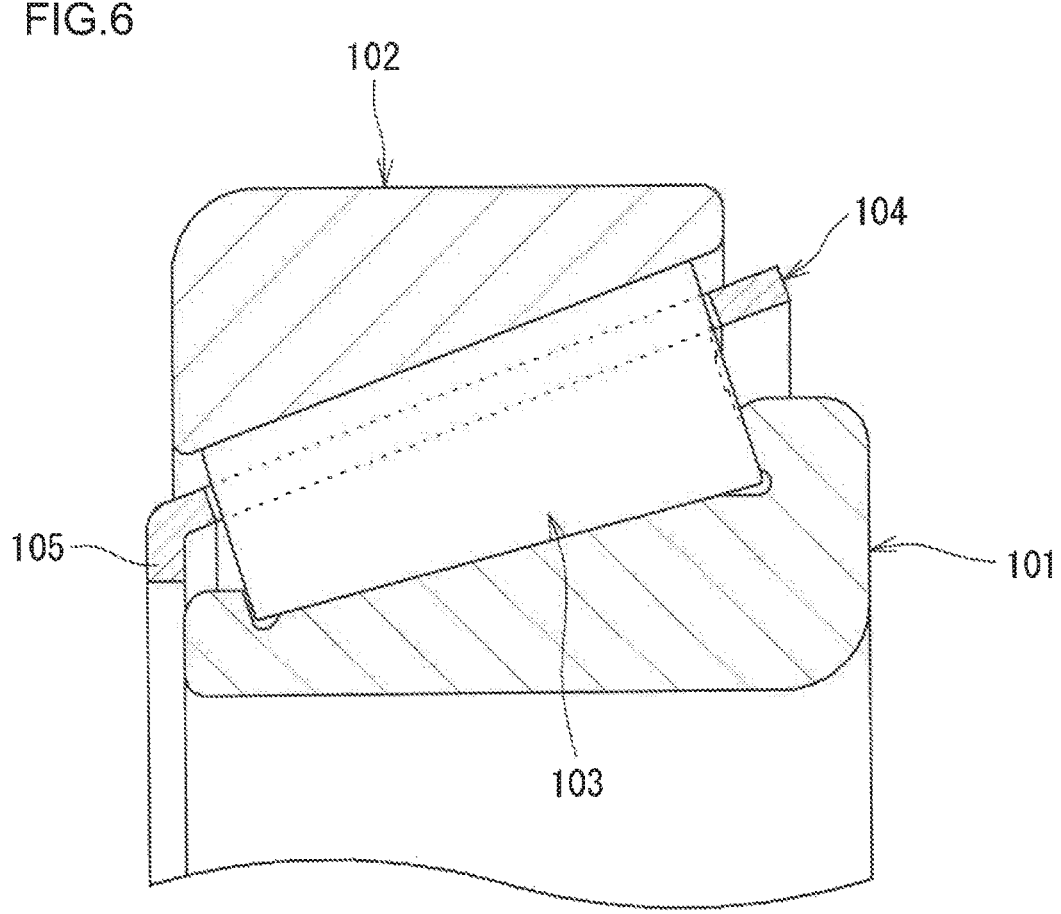
FIG. 6 is an axial sectional view depicting a roller bearing according to a related art.

FIG. 5 is a graph illustrating a relationship between an increase in the temperature of the outer ring and the ratio between the area A of the lubricant inlets and the area B of the lubricant outlets. As is apparent from FIG. 5, the temperature of the outer ring more significantly increases in a related art in which the area B of the lubricant outlets is larger than the area A of the lubricant inlets (A/B<1). FIG. 5 indicates that an increase in the temperature of the outer ring is more appropriately suppressed by examples 1 and 2 of the invention in which the area B of the lubricant outlets is smaller than the area A of the lubricant inlets (A/B>1) than by the related art. FIG. 5 also indicates that example 2 having a higher ratio (A/B) between the area A of the inlets and the area B of the outlets more appropriately suppresses an increase in the temperature of the outer ring than example 1. Therefore, it is effective to set the area B of the lubricant outlets smaller than the area A of the lubricant inlets as in the invention in order to suppress increase in temperature of the tapered roller bearing 1, extending the life of the tapered roller bearing 1.

The disclosed embodiment is illustrative and is not restrictive. The scope of rights of the invention is indicated by the claims and includes configurations in the claims and all variations thereof within the range of equivalency. For example, in the above-described embodiments, the case has been illustrated where the invention is applied to the tapered roller bearing. However, the invention is applicable to any other form of rolling bearing with a contact angle such as an angular contact ball bearing.

In the above-described embodiments, in the cage 10, the recessed portions 33 are each formed between the corresponding first guided portion 41 and second guided portion 42. However, the recessed portions 33 may be omitted, that is, the cage 10 may be shaped such that each first guided portion 41 and the corresponding second guided portion 42 are integrally connected together. The first guided portions 41 may be omitted with only the second guided portions 42 provided. The blocking portions for reducing the outlets E22 in size may be formed in the large-diameter annular portion 12.

The rolling bearing in the invention can be suitably lubricated during use even in an environment in which only a small amount of lubricant is supplied.

What is claimed is:

1. A rolling bearing comprising:
   an inner ring having a raceway surface on an outer periphery of the inner ring;
   an outer ring having a raceway surface on an inner periphery of the outer ring;
   a plurality of rolling elements arranged between the raceway surface of the inner ring and the raceway surface of the outer ring; and
   a cage that holds the rolling elements at intervals in a circumferential direction, and includes a first annular portion, a second annular portion, and a plurality of cage bars positioned between the first annular portion and the second annular portion, the first annular portion having a smaller diameter than the second annular portion,
   wherein
   the raceway surfaces have a contact angle with each of the rolling elements,
   an area of clearances formed among the inner ring, the outer ring, the rolling elements, and the cage as axially viewed from an axially first side of the raceway surfaces that is a small diameter side of the raceway surfaces is larger than an area of clearances formed among the inner ring, the outer ring, the rolling elements, and the cage as axially viewed from an axially second side of the raceway surfaces that is a large diameter side of the raceway surfaces,
   each of the cage bars has a first guided portion, a second guided portion, and a recessed portion that is formed between the first guided portion and the second guided portion,
   the first guided portion is formed on the small diameter side and has a radially outer guided surface that is flush with an outer peripheral surface of the first annular portion and is in sliding contact with the outer ring raceway surface, and
   the second guided portion has a radially outer guided surface that is in sliding contact with the outer ring raceway surface.

2. The rolling bearing according to claim 1, wherein the rolling bearing is a tapered roller bearing.

3. The rolling bearing according claim 2, wherein
   a radial distance between the first annular portion and the inner ring is longer than a radial distance between the first annular portion and the outer ring.

4. The rolling bearing according to claim 2, wherein
   a radial distance between the second annular portion and the outer ring is longer than a radial distance between the second annular portion and the inner ring.

5. The rolling bearing according to claim 4, wherein
   the cage includes a blocking portion that blocks a part of each of the clearances among the second annular portion and the outer ring and the rolling elements as axially viewed from the axially second side.

6. The rolling bearing according to claim 4, wherein
   the second guided portion is configured to block a part of each clearance.

7. The rolling bearing according claim 1, wherein
   a radial distance between the first annular portion and the inner ring is longer than a radial distance between the first annular portion and the outer ring.

8. The rolling bearing according to claim 1, wherein
   a radial distance between the second annular portion and the outer ring is longer than a radial distance between the second annular portion and the inner ring.

9. The rolling bearing according to claim 8, wherein
   the cage includes a blocking portion that blocks a part of each of the clearances among the second annular portion and the outer ring and the rolling elements as axially viewed from the axially second side.

10. The rolling bearing according to claim 1, wherein
    the second guided portion is shaped to extend in the circumferential direction along an outer peripheral surface of the rolling elements such that a circumferential dimension of the second guided portion increases toward an outer side in the radial direction.

* * * * *